United States Patent Office 3,642,653
Patented Feb. 15, 1972

3,642,653
WATER DISPLACING CORROSION PREVENTIVE
Barbara J. Northan and David B. Boies, Chicago, Ill., assignors to the United States of America as represented by the Secretary of the Navy
No Drawing. Filed Jan. 2, 1969, Ser. No. 789,067
Int. Cl. C23f *11/16*
U.S. Cl. 252—389                     5 Claims

ABSTRACT OF THE DISCLOSURE

An effective corrosion preventive composition comprising in general a combination of an alkylaryl sulfonate with a surface active agent such as partial organic phosphate esters neutralized with ethylenediamine or barium. A microcrystalline wax may be added to the composition to enhance durability characteristics thereof.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the invention

This invention relates to new compositions of matter and more particularly to new compositions which retard and prevent corrosion.

(2) Description of the prior art

Corrosion has been defined as the destruction of metals by reacting with the environment. Generally speaking corrosion is divided into three classes, none of which possess a clear line of demarcation one from the other. However, for study purposes the classes of corrosion include (1) chemical, (2) galvanic, and (3) concentration cell.

Chemical corrosion has been defined as the reaction of a material with some portion of its environment which results in deterioration of the material. Galvanic corrosion is an electrolytic reaction set up when two dissimilar metals are in electrical contact in an electrolyte. This reaction results in deterioration of the metal that is anodic in that particular joint. Concentration cell corrosion occurs in enclosed joints on metal surfaces. When such joints are wet, the moisture therein becomes stagnant. Diffusion of oxygen into the stagnant area is hindered which creates an unbalanced condition and causes an electrolytic action in which electricity flows from inside the joint to outside thereof and produces deterioration of the metal inside the joint.

Each of the foregoing classes of corrosion requires the presence of moisture. Accordingly, to successfully combat corrosion all that is required is to keep the moisture out. This is done in many different ways, prominent among which is the utilization of paint coatings.

The protective capacity of a paint film includes the inhibition of the cathodic or anodic reaction. Specifically the cathodic reduction of oxygen is influenced by hindering electron transfer or the transport of oxygen and water while the anodic reaction is prevented by incorporating within the paint a suitable pigment which acts as an inhibitor.

However, all painted surfaces are subject to eventual failure or breakdown at a rate depending on the type of paint employed and the environment in which the painted surface is utilized. Usually damaged portions of painted film surfaces occur in small areas and particularly so on aluminum metal surfaces such as aircraft fuselages, building sidings, etc.

Corrosion which may occur in small damaged areas of paint films on aluminum metal utilized in the manufacture of aircraft is a serious problem since a slight amount of metal loss can lead to perforation and structural failure. Accordingly a need exists for a temporary preventive at such damaged areas to protect the surface until it can be repainted.

SUMMARY OF THE INVENTION

Thus, the present invention involves a new composition for retarding corrosion comprising a combination of a natural petroleum sulfonate and a salt of a complex phosphate ester. A microcrystalline wax may be added to enhance durability of the film.

This composition supplies the existing need for a temporary corrosion preventive composition which is easily applied to areas on metals where damaged paint film occurs. It is colorless, readily applied, flexible, nontacky and easily removed.

STATEMENT OF THE OBJECTS OF INVENTION

It is an object of the present invention to provide a corrosion preventive composition for application to damaged areas of paint films on metal surfaces which is superior to those of the prior art.

Another object of the present invention is to provide a novel composition for protection against corrosion which is colorless, easily applied, flexible, nontacky and easily removed.

A further object of the present invention is to provide temporary corrosion preventive compounds which are both economical and effective in use.

Other objects, advantages, and novel features of the invention will become apparent from the following detailed description of the invention.

DESCRIPTION OF THE PREFERRED EMBODIMENT

Broadly stated the present invention is a corrosion preventive composition comprising a combination of 2 parts of an alkylaryl sulfonate and 1 part of a suitable surface active agent. A microcrystalline wax is added to increase the physical properties of the anti-corrosion film formed by this composition in the following relationship:

|  | Percent |
|---|---|
| 2 parts alkylaryl sulfonate plus 1 part surface active agent | 90 |
| Wax | 10 |

This formulation may be dissolved in mineral spirits in a ratio of 1 part corrosion preventive composition to 3 parts mineral spirits and then packaged in a pressurized spray container using dichlorodifluoromethane (Freon-12) as the propellant. However, any suitable manner of dissolving and utilizing the present composition may be employed.

In general the alkylaryl sulfonates employed had to both displace water and prevent corrosion. Of the vast hordes of alkylaryl sulfonates available, only those which were anionic and of relatively low molecular weight were effective. These chemicals were equally effective as either sodium or ammonium salts. In particular sodium sulfonate, ammonium sulfonate and barium sulfonate produced the best results.

Of the several phosphate-based surface active agents tested, the only ones which proved useful were salts of partial phosphate esters represented generally by the formula R—O—P(O)(OH)OM wherein R is an organic group, including an ethoxylated alkyl phenol, and M is a salt-forming cation, including barium or an amine. R is chosen to provide the proper hydrophylic/hydrophobic ratio upon which the effectiveness of these phosphate based chemicals appeared to be dependent. Specifically barium salt of a partial phosphate ester and an ethylenediamine salt of a partial phosphate ester were found to provide the best results.

The following table documents the results of water displacement and corrosion tests. Test specimens were polished and sprayed with the salt solutions. After one minute, one milliliter of test compound was allowed to run down the specimen. The specimen was then rated for water displacement and then placed in a closed container above a water bath. After 24 hours the specimen was cleaned to remove the test material and the corrosion products. It was then examined microscopically for evidence of corrosion. Other specimens were also prepared as above and using the same test compounds were positioned in sea spray apparatus and exposed for varying time periods. They were then examined microscopically after being cleaned for evidence of corrosion. Other similarly prepared specimens were dipped in aqueous solutions in controlled time sequences after which they were cleaned and microscopically examined.

TABLE I.—RESULTS OF WATER-DISPLACEMENT AND CORROSION TESTS

| Chemical | Type | Water displacement | Corrosion | |
|---|---|---|---|---|
| | | | General | Pitting |
| Sodium sulfonate | Anionic | Effective | Slight | None. |
| Ammonium sulfonate | do | do | do | Slight. |
| Barium sulfonate | do | do | None | Do. |
| Partial phosphate ester, barium salt | do | do | Slight | None. |
| Partial phosphate ester, ethylenediamine salt | do | do | do | Do. |
| Dimethyl cocoamine | Cationic | do | None | Severe. |
| Ethoxylated cocoamine | do | do | Severe | Do. |
| Oleic acid imidazoline | do | do | None | Do. |
| Ethoxylated nonylphenol | Nonionic | do | Moderately severe | Moderately severe. |
| Fatty alkanolamide | do | do | Severe | Severe. |

All test chemicals were satisfactory in being easily applied, flexible, nontacky and easily removable. Moreover all compounds were satisfactory in displacing water which is a necessary characteristic in any corrosion preventive composition. However only those which were anionic showed acceptable characteristics against corrosion.

Further tests indicated that the sulfonates provided better film retention for long time exposure while the phosphate ester surface active agents provided the best protection against a pitting corrosion.

A microcrystalline wax is added to enhance stability of the composition and to decrease tackiness of the film. The waxes most suitable for this purpose appeared to be the hard microcrystalline waxes having a melting point of between 165° to 180° F. and with a hardness of between 16 and 25.

It should be noted that in developing the present corrosion resistant composition sodium sulfonate was combined with the following corrosion inhibitors: t-butyl chromate; t-butyl chromate and a barium salt of a partial phosphate ester; zinc yellow; alizarin. While all of the foregoing compositions were effective, they formed highly colored films. Since a composition which formed colorless films was desired, no further research on these compositions was believed feasible at the present time.

What is claimed is:
1. A composition utilized as a deterrent against corrosion comprising in intimate admixture:
   an anionic alkylaryl sulfonate;
   an anionic surface active agent having the general formula:
   R—O—P(O)(OH)OM
   in which R is an ethoxylated alkyl phenol and M is a salt forming cation selected from the group consisting of barium and an amine; and
   a microcrystalline wax to enhance stability of the composition, said wax having a melting point in the range of between 165° to 180° F. and a hardness of between 16 and 25;
   the ratio of said sulfonate to said surface active agent being about 2:1, and the total amount of said combined sulfonate and surface active agent being about 90% while the amount of said wax being about 10%.
2. The composition as defined in claim 1 wherein:
   the alkylaryl sulfonate is selected from the group consisting of sodium sulfonate, ammonium sulfonate and barium sulfonate;
   the anionic surface active agent is selected from the group consisting of a barium salt of a partial phosphate ester and an ethylenediamine salt of a partial phosphate ester.
3. The composition as defined in claim 2 wherein the thus defined composition is dissolved in mineral spirits in a ratio of 1:3 and packaged in a pressurized container utilizing dichlorodifluoromethane as the propellant.
4. An anti-corrosion composition comprising in intimate admixture:
   sodium sulfonate;
   barium salt of a partial phosphate ester;
   a microcrystalline wax having a melting point in the range of between 165° to 180° F. and a hardness of between 16 and 25;
   said sodium sulfonate and barium salt being present in a ratio of about 2:1 with said ratio of sulfonate and barium salt comprising about 90% of the composition and the microcrystalline wax comprising the remaining 10%.
5. The anti-corrosion composition of claim 4 wherein said composition is dissolved in mineral spirits in a ratio of 1 part composition to 3 parts mineral spirits and packaged in a pressurized container utilizing dichlorodifluoromethane as the propellant.

References Cited
UNITED STATES PATENTS

| 2,524,590 | 10/1950 | Boe | 252—305 |
| 3,033,889 | 5/1962 | Chiddix et al. | 252—389 |
| 3,080,330 | 3/1963 | Rudel et al. | 252—395 |

RICHARD D. LOVERING, Primary Examiner
I. GLUCK, Assistant Examiner

U.S. Cl. X.R.
21—2.5; 106—14; 117—105, 134; 252—138, 161, 305, 395